(12) United States Patent
Hodgson et al.

(10) Patent No.: US 8,506,679 B2
(45) Date of Patent: Aug. 13, 2013

(54) WATER RECOVERY USING THERMALLY LINKED SORBENT BEDS

(75) Inventors: Edward W. Hodgson, Granby, CT (US); William G. Papale, Jr., Simsbury, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 199 days.

(21) Appl. No.: 12/912,237

(22) Filed: Oct. 26, 2010

(65) Prior Publication Data
US 2012/0097029 A1 Apr. 26, 2012

(51) Int. Cl.
*B01D 53/04* (2006.01)
*B01D 53/26* (2006.01)

(52) U.S. Cl.
USPC ............. 95/91; 95/115; 95/126; 96/126

(58) Field of Classification Search
USPC ............ 95/14, 91, 114, 115, 117, 121, 126; 96/121, 126, 130, 146; 62/3.2, 3.3, 271
See application file for complete search history.

(56) References Cited

U.S. PATENT DOCUMENTS

| | | | | |
|---|---|---|---|---|
| 3,734,293 A * | 5/1973 | Biskis | ................ | 210/185 |
| 3,850,592 A | 11/1974 | Huffman | | |
| 4,183,734 A * | 1/1980 | Leppard et al. | ............ | 95/105 |
| 4,793,143 A * | 12/1988 | Rhodes | ................ | 62/93 |
| 5,759,236 A * | 6/1998 | Bruck et al. | ................ | 95/41 |
| 5,950,447 A * | 9/1999 | Maeda et al. | ............ | 62/271 |
| 6,364,938 B1 | 4/2002 | Birbara et al. | | |
| 6,709,483 B1 | 3/2004 | Hodgson, Jr. | | |
| 6,755,892 B2 | 6/2004 | Nalette et al. | | |
| 6,828,499 B2 * | 12/2004 | Max | ................ | 136/246 |
| 2006/0130652 A1 * | 6/2006 | Takewaki et al. | ............ | 95/148 |
| 2009/0050550 A1 | 2/2009 | Matsuura et al. | | |

FOREIGN PATENT DOCUMENTS

| | | |
|---|---|---|
| DE | 3226502 A1 | 2/1983 |
| EP | 1275429 A1 | 1/2003 |
| EP | 1332783 B1 | 5/2007 |

OTHER PUBLICATIONS

The extended European Search Report of counterpart European Application No. 11189841.7 filed Nov. 18, 2011.

* cited by examiner

*Primary Examiner* — Frank Lawrence, Jr.
(74) *Attorney, Agent, or Firm* — Kinney & Lange, P.A.

(57) ABSTRACT

A water recovery system includes a sorbing bed, a desorbing bed, a heat pump and a controller. The sorbing bed receives a first fluid stream and absorbs and/or adsorbs water from the first fluid stream. The desorbing bed is aligned with and thermally connected to the sorbing bed, and receives a second fluid stream and desorbs water to the second fluid stream. The heat pump is positioned between the sorbing bed and the desorbing bed and transfers heat from the sorbing bed to the desorbing bed. The controller distributes power to the heat pump to maintain an area near the outlet of the desorbing bed at a temperature greater than an area of the sorbing bed aligned with the area near the outlet of the desorbing bed. A method for recovering water from a fluid stream includes directing fluid streams through the described water recovery system.

20 Claims, 5 Drawing Sheets

WATER RECOVERY USING THERMALLY LINKED SORBENT BEDS

BACKGROUND

Water recovery is an important process in spacecraft environments and some other closed atmospheres. Dry air streams are desirable or necessary for certain essential spacecraft processes like carbon dioxide removal. Some carbon dioxide removal systems (molecular sieve) cannot tolerate humidity in the incoming fluid stream. Others (amine sorbent) undesirably lose the humidity content of the fluid stream. On short spacecraft missions, for example, moisture recovery may not be critical and amine sorbents can function adequately. However, on longer missions, it may be necessary to recover moisture so that it can be reused. In these cases, water recovery is usually addressed prior to carbon dioxide removal. In current practice, water recovery from process air utilizes desiccant media that are cyclically loaded by removing water from a humid process stream and unloaded by heating to desorb the adsorbed water and return it to the dry exiting process stream.

Conventional water recovery systems require large amounts of thermal energy and/or large pieces of equipment. Due to water's high heat of vaporization, large amounts of heat are released as the water vapor is removed from the process air stream and must be removed from the adsorbing dessicant bed to maintain a temperature favorable for effective adsorption performance. Conversely, a large amount of heat energy must be added to supply the heat of vaporization for water vapor release from the desorbing dessicant bed to the exiting process air stream before it is returned to the cabin. This heat input requirement is compounded by the need to heat the desorbing dessicant to an elevated temperature (above the adsorbing bed temperature) to effectively drive off the adsorbed water vapor. In conventional systems, the heat transport away from the desorbing bed and into the desorbing bed is commonly provided by the process air stream. This requires large temperature changes in the air and in the dessicant material because the specific heat of the air stream is small in comparison to the heat of vaporization of the water vapor that it carries. Energy supply requirements may be reduced by the use of regenerative process air heat exchangers, but their utility is limited by the need to raise the desorbing bed exit air flow to a temperature well above the temperature of the air exiting the adsorbing dessicant bed. While these heat exchangers can offer energy consumption and design integration advantages, they are significant contributors to the total system pressure drop, mass and cost. The system mass can be reduced by cycling smaller desiccant beds more rapidly, but this increases the energy requirements to support the thermal swings of the beds increasing the size of air heaters and heat exchangers as well as system power input. Thus, current water removal systems are inherently large and require large amounts of energy to operate.

SUMMARY

A water recovery system includes a sorbing bed, a desorbing bed, a heat pump and a controller. The sorbing bed includes an inlet, a sorbent and an outlet. The sorbing bed receives a first fluid stream and sorbs water from the first fluid stream. The desorbing bed includes an inlet, a sorbent and an outlet, is aligned with and thermally connected to the sorbing bed, and receives a second fluid stream and desorbs water to the second fluid stream. The heat pump is positioned between the sorbing bed and the desorbing bed and transfers heat from the sorbing bed to the desorbing bed. The controller distributes power to the heat pump to maintain an area near the outlet of the desorbing bed at a temperature greater than an area of the sorbing bed aligned with the area near the outlet of the desorbing bed.

A method for recovering water from a fluid stream includes directing a first fluid stream through a first sorbent bed so that water in the first fluid stream is sorbed by a first sorbent within the first sorbent bed. The method also includes heating a second sorbent bed with heat generated by the sorption of water in the first sorbent bed. The second sorbent bed is positioned adjacent to and thermally linked with the first sorbent bed. The second sorbent bed includes a fluid stream inlet, a sorbent, a fluid stream outlet and a bed length equal to a distance between the inlet and the outlet. The method further includes powering a heat pump located between the first sorbent bed and a second sorbent bed to actively heat the second sorbent bed and cool the first sorbent bed. The method also includes directing a second fluid stream through the second sorbent bed so that when the second sorbent bed is heated, water is desorbed from the second sorbent located within the second sorbent bed and removed from the second sorbent bed by the second fluid stream. The method further includes maintaining an area of the second sorbent bed at a temperature greater than a temperature of the first sorbent bed at an area adjacent to the area of the second sorbent bed. The heated area of the second sorbent bed extends from the fluid stream outlet to a length of the second sorbent bed between about 10% and about 100% of the bed length.

DETAILED DESCRIPTION

The present invention provides a compact, low power water recovery system and method for recovering water from fluid streams. The water recovery system utilizes thermally linked sorbent beds where heat generated by water absorption at the sorbing bed is transferred to the desorbing bed to be used for water desorption. Minimal additional energy is used to cool the sorbing bed near its outlet and heat the desorbing bed near its outlet. Cooling the later stages of the sorbing bed and heating the later stages of the desorbing bed optimizes the exiting fluid streams. The fluid stream leaving the sorbing bed is drier and the fluid stream leaving the desorbing bed contains more water than when passive heat transfer is used alone. This water recovery system enables the use of small bed sizes that can be frequently cycled between sorption and desorption without incurring significant power penalties because the difference between the temperatures of the adsorbing and desorbing beds is always small.

According to the water recovery systems and methods described herein, process streams include any fluid stream. Process streams generally include fluid streams circulating within closed environments including, but not limited to, spacecraft, submarine, and aircraft environments. Exemplary process streams include process air streams in spacecraft and aircraft, such as cabin air. These process streams contain water vapor that can be removed from the stream and reintroduced into the same stream or another stream to recover and reuse the removed water vapor.

Figure 1:
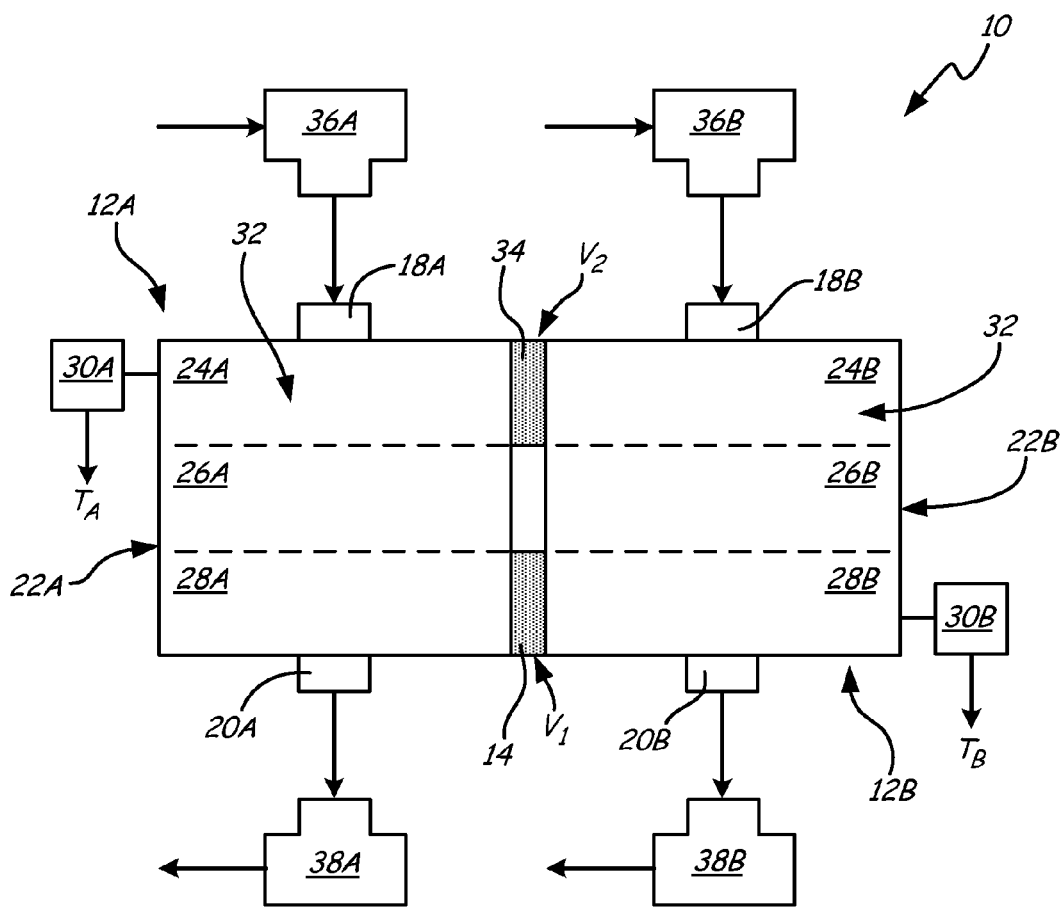
FIG. 1 illustrates a water recovery system.

FIG. 1 illustrates one embodiment of water recovery system 10. Water recovery system 10 includes first sorbent assembly 12A, second sorbent assembly 12B, heat pump 14 and controller 16. First sorbent assembly 12 and second sorbent assembly 12B are aligned and thermally linked. That is, first sorbent assembly 12A and second sorbent assembly 12B are proximal to one another and arranged so that heat generated by one sorbent assembly can be transferred to the other. FIG. 1 illustrates first sorbent assembly 12A and second sorbent assembly 12B side-by-side so that each section of first sorbent assembly 12A is aligned to a corresponding section of second sorbent assembly 12B. Thermal linkages allow heat from one section of a sorbent assembly to transfer to the corresponding section of the other sorbent assembly. The thermal linkages are configured so the heat transfer can occur passively and/or actively.

First sorbent assembly 12A includes passages 18A and 20A and bed 22A. Passage 18A allows a fluid stream to enter or exit first sorbent assembly 12A depending on the direction of flow. As shown in FIG. 1, passage 18A is an inlet. Once a fluid stream has entered first sorbent assembly 12A through passage 18A, the fluid stream travels through bed 22A. Bed 22A contains sorbent material 32. The fluid stream travels through bed 22A to passage 20A. Passage 20A allows a fluid stream to enter or exit first sorbent assembly 12A depending on the direction of flow. As shown in FIG. 1, passage 20A is an outlet.

Bed 22A shown in FIG. 1 contains three bed sections. While bed 22A is continuous, the different bed sections will be described in order to better explain the present invention. Bed section 24A is located in the area near inlet passage 18A, bed section 28A is located in the area near outlet passage 20A and bed section 26A is located between bed sections 24A and 28A. Where passage 18A is an inlet for first sorbent assembly 12A, the fluid stream generally travels from bed section 24A to bed section 26A to bed section 28A and exits first sorbent assembly 12A at passage 20A. The sorbing and desorbing operation of first sorbent assembly 12A is described in greater detail below.

Sorbent material 32 present in bed 22A is capable of both sorbing (absorbing and/or adsorbing) water from and desorbing water to a fluid stream. Sorbent material 32 absorbs or adsorbs water from a fluid stream containing water vapor. Heat is generated when water is absorbed or adsorbed by the sorbent material 32. Upon the application of sufficient thermal energy, sorbent material 32 will desorb water so that it can be removed by a fluid stream. Suitable sorbent materials 32 do not absorb or adsorb significant amounts of carbon dioxide. In exemplary embodiments, sorbent material 32 is water-specific. That is, sorbent material 32 absorbs or adsorbs only water. Suitable sorbent materials 32 include silica gels, zeolite molecular sieves, anion/cation ion exchange media, ceramic or polymeric substrates impregnated with one or more hygroscopic salts and combinations thereof. Examples of the hygroscopic salts impregnated within the ceramic or polymeric substrates include but are not limited to cesium carbonate, cesium fluoride, calcium chloride and lithium bromide. In exemplary embodiments, sorbent material 32 has an average particle diameter ranging from about 350 microns to about 1400 microns.

Second sorbent assembly 12B is similar or identical to first sorbent assembly 12A in construction. Second sorbent assembly 12B includes passages 18B and 20B and bed 22B. Like passage 18A, passage 18B allows a fluid stream to enter or exit second sorbent assembly 12B depending on the direction of flow. As shown in FIG. 1, passage 18B is an inlet. Once a fluid stream has entered second sorbent assembly 12B through passage 18B, the fluid stream travels through bed 22B. Bed 22B contains sorbent material 32. The fluid stream travels through bed 22B to passage 20B. Passage 20B allows a fluid stream to enter or exit second sorbent assembly 12B depending on the direction of flow. As shown in FIG. 1, passage 20B is an outlet.

Bed 22B shown in FIG. 1 contains three bed sections. While bed 22B is continuous, the different bed sections will be described in order to better explain the present invention. Bed section 24B is located in the area near inlet passage 18B, bed section 28B is located in the area near outlet passage 20B and bed section 26B is located between bed sections 24B and 28B. Where passage 18B is an inlet for second sorbent assembly 12B, the fluid stream generally travels from bed section 24B to bed section 26B to bed section 28C and exits second sorbent assembly 12B at passage 20B. Bed 22A of first sorbent assembly 12A and bed 22B of second sorbent assembly 12B are aligned and thermally linked. For example, bed section 24A is aligned with bed section 24B and heat can be transferred from one bed section to the other. That is, due to their proximity and thermal linkage, heat can be transferred from bed section 24A to bed section 24B and vice versa. Bed sections 26A and 26B and bed sections 28A and 28B are similarly aligned and thermally linked so that heat can be transferred from a section on one bed to its aligned section on the other bed. As beds 22A and 22B are continuous, heat transfer is not strictly limited only to transfer between aligned bed sections. However, generally speaking, heat is typically transferred from one area of the bed to a proximate area of the other bed. Heat can be transferred between aligned bed sections passively (via conduction), actively (via heat pump) or both passively and actively.

In FIG. 1, heat pump 14 is shown at the interface between bed section 28A of first sorbent assembly 12A and bed section 28B of second sorbent assembly 12B. Heat pump 14 is configured to actively heat one bed section and cool the other. Heat pump 14 can be configured to transfer heat between beds 22A and 22B or actively heat one bed and cool the other. For example, heat pump 14 can heat bed section 28A while cooling bed section 28B and vice versa. Unlike passive heat transfer, heat pump 14 allows the transfer of thermal energy against a thermal gradient. In exemplary embodiments, heat pump 14 is integrated within water recovery system 10. In one exemplary embodiment, heat pump 14 is a thermoelectric device. Thermoelectric devices take advantage of the thermoelectric effect, which describes the direct conversion of temperature differences to electric voltage and vice versa. A thermoelectric device creates a voltage when there is a different temperature on each side. Conversely, when a voltage is applied to a thermoelectric device, it creates a temperature difference (i.e. one side is heated while the other side is cooled). When heat pump 14 is a thermoelectric device, a voltage is applied to the thermoelectric device to heat one bed section (bed section 28B, for example) and cool the other bed section (bed section 28A). While heat pump 14 can take forms other than a thermoelectric device, water recovery system 10 will be described in greater detail where heat pump 14 is a thermoelectric device.

A power source and controller are necessary to activate thermoelectric device 14. In exemplary embodiments, direct current power is routed from an existing power source on the spacecraft or aircraft to thermoelectric device 14. Controller 16 receives power from the power source and distributes power to thermoelectric device 14. Controller 16 determines the voltage to be applied to thermoelectric device 14 at a given time based on factors that can include the water recovery application, the sizes of beds 22A and 22B and the temperatures of beds 22A and 22B. For example, in one embodiment of water recovery system 10, temperature sensors 30A and 30B measure the temperatures of beds 22A ($T_A$) and 22B ($T_B$), respectively, and communicate the measured temperatures to controller 16. Based on the temperatures received from temperature sensors 30A and/or 30B, controller 16 distributes a determined voltage ($V_1$) to thermoelectric device 14. Where water recovery system 10 includes a second thermoelectric device (heat pump 34), controller 16 distributes a determined voltage ($V_2$) to thermoelectric device 34. Embodiments of water recovery system 10 containing second thermoelectric device 34 are discussed in greater detail below. The application of $V_1$ or $V_2$ to thermoelectric devices 14 and 34 allows the heating of one bed and the cooling of the other.

According to FIG. 1, water recovery system 10 is arranged so that water from a fluid stream is sorbed (absorbed and/or adsorbed) in first sorbent assembly 12A and desorbed in second sorbent assembly 12B. A fluid stream containing water vapor is delivered through inlet passage 18A to first sorbent assembly 12A (the sorbing bed). The fluid stream enters first sorbent assembly 12A and passes through bed 22A containing sorbent material 32, starting at bed section 24A. Water present in the fluid stream is sorbed by sorbent material 32 in bed section 24A. The sorption of water by sorbent material 32 is exothermic. Thus, heat is generated by the sorption in bed section 24A. This heat is passively transferred to bed section 24B, which is thermally linked with bed section 24A. The fluid stream continues through bed 22A to bed section 26A. At this point, the fluid stream has less water vapor than when it entered due to the sorption in bed section 24A. Additional water is sorbed by sorbent material 32 in bed section 26A and additional heat is generated. The amount of water sorbed and heat generated in bed section 26A is generally less than the water sorbed and the heat generated in bed section 24A. The heat generated by sorption in bed section 26A is passively transferred to bed section 26B, which is thermally linked with bed section 26A. The fluid stream continues through bed 22A to bed section 28A. At this point, the fluid stream has some, but little, water vapor remaining. More water is sorbed by sorbent material 32 in bed section 28A and additional heat is generated. The amount of water sorbed and heat generated in bed section 28A is generally less than the water sorbed and the heat generated in bed section 26A. The heat generated by sorption in bed section 28A is actively transferred to bed section 28B, using heat pump 14. In the case where heat pump 14 is a thermoelectric device, a voltage is applied to heat pump 14 to heat bed section 28B and cool bed section 28A transferring the heat generated by sorption from bed 28A to bed 28B against a small adverse temperature gradient. Thus, bed sections 24B and 26B are passively heated by bed sections 24A and 26A, respectively, while bed section 28B is heated by both the heat of adsorption from bed section 28A and the electric energy added to heat pump 14. A fluid stream drier than the incoming fluid stream exits first sorbent assembly 12A through outlet passage 20A.

At the same time that the fluid stream containing water vapor is introduced to first sorbent assembly 12A, a dry fluid stream is introduced to second sorbent assembly 12B. The dry fluid stream is delivered through inlet passage 18B to second sorbent assembly 12B (the desorbing bed). The dry fluid stream enters second sorbent assembly 12B and passes through bed 22B having sorbent material 32 containing water from a previous sorption cycle, starting at bed section 24B. Heat is applied to bed section 24B so that water contained by sorbent material 32 is desorbed and enters the fluid stream passing through bed section 24B. The heat needed to desorb the water in bed section 24B is provided by the heat generated by water sorption in bed section 24A. This heat is transferred via the thermal linkage between these bed sections. The desorption of water by sorbent material 32 is endothermic. The fluid stream continues through bed 22B to bed section 26B. Sorbent material 32 in bed section 26B generally contains more water than that in bed section 24B. At this point, the fluid stream contains more water vapor than when it entered due to the desorption in bed section 24B. Additional water is desorbed by sorbent material 32 in bed section 26B. The heat needed to desorb the water in bed section 26B is provided by the heat generated by water sorption in bed section 26A. This heat is transferred via the thermal linkage between these bed sections. The amount of water desorbed in bed section 26B is generally greater than the water desorbed in bed section 24B. The fluid stream continues through bed 22B to bed section 28B. Sorbent material 32 in bed section 28B generally contains more water than that in bed section 26B. More water is desorbed by sorbent material 32 in bed section 28B. The heat needed to desorb the water in bed section 28B is provided by the heat generated by water sorption in bed section 28A and transferred by heat pump 14 allowing bed section 28B to operate at a slightly higher temperature than bed section 28A. Heat pump 14 also adds the electrical energy supplied to operate the heat pump to bed section 28B as heat. Since sorbent material 32 in bed section 28B generally contains more water than that of bed sections 24B and 26B, more heat is needed to desorb the water. The amount of water desorbed in bed section 28B is generally greater than the water desorbed in bed section 26B. A fluid stream with higher humidity than the incoming fluid stream exits second sorbent assembly 12B through outlet passage 20B.

Heat pump 14 is configured to cool bed section 28A and heat bed section 28B when first sorbent assembly 12A is the sorbing bed and second sorbent assembly 12B is the desorbing bed. By cooling bed section 28A, the amount of water that the fluid stream passing through first sorbent assembly 12A can carry is reduced. This increases water sorption in bed section 28A and provides for a drier exiting fluid stream than if no active cooling was used. By heating bed section 28B, the amount of water that the fluid stream passing through second sorbent assembly 12B can carry is increased. This increases water desorption in bed section 28B and provides for a more humid exiting fluid stream than if only passive heating of bed section 28B was used. Thus, in exemplary embodiments, the area of the desorbing bed near the outlet will have a temperature greater than the area of the absorbing bed near the outlet. In exemplary embodiments, the difference in temperature between bed sections 28B and bed section 28A is between about 2° C. and about 50° C. In even more exemplary embodiments, the difference in temperature between bed sections 28B and bed section 28A is between about 5° C. and about 30° C. By the application of a relatively small voltage to a thermoelectric device (heat pump 14), the exiting fluid streams from the absorbing and desorbing beds can be maximized for dryness and humidity, respectively, to provide an efficient water recovery system. As noted above, the use of external heat exchangers increases the cost and weight of the recovery system. Water recovery system 10 provides a simple and efficient system that requires only minimal energy input without the need for heavier heat exchange systems.

Since only minimal energy is required for active bed heating and cooling and the thermal linkages between the sorbent beds allow passive transfer of heat generated during water sorption, first and second sorbent assemblies 12A and 12B can be cycled between sorbing and desorbing modes frequently. The cycle time between the switching of the sorbing and desorbing beds is determined based on the size of beds 22A and 22B and the application of water recovery system 10. In exemplary embodiments, cycle times are between about 1 minute and about 60 minutes.

Figure 2:
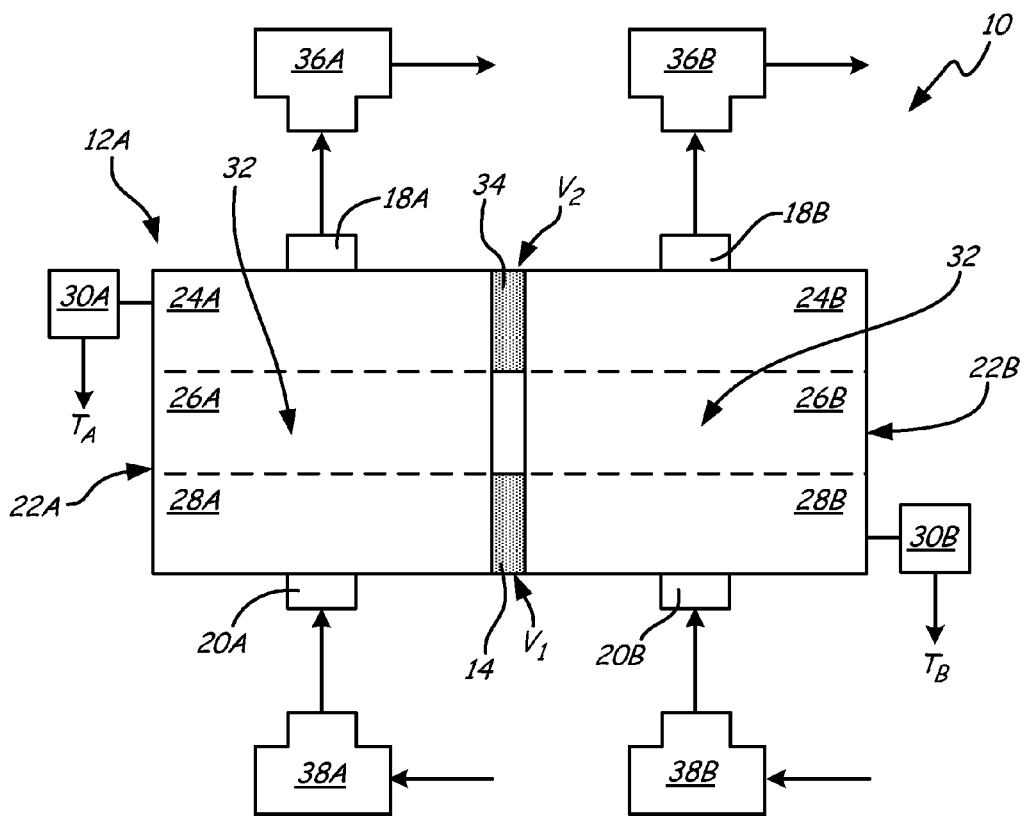
FIG. 2 illustrates the water recovery system of FIG. 1 where the sorbing and desorbing beds are switched.
Figure 2:
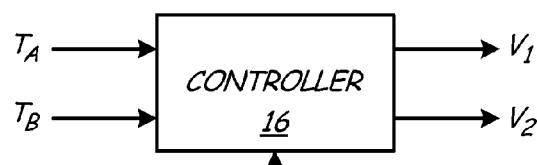

FIG. 2 illustrates the same water recovery system 10 shown in FIG. 1 where the sorbing and desorbing beds are switched. First sorbent assembly 12A is now the desorbing bed and second sorbent assembly 12B is the sorbing bed. A fluid stream containing water vapor is introduced to bed 22B through inlet passage 20B, travels through bed 22B and exits second sorbent assembly 12B at outlet passage 18B. As water is sorbed by sorbent material 32 within bed 22B, the heat generated by sorption is passively transferred to bed 22A through the thermal linkage. Additionally, a second heat pump (heat pump 34) located at the interface between bed section 24A and bed section 24B actively heats bed section 24A and cools bed section 24B. Heat pump 34 functions in the same way as heat pump 14. In exemplary embodiments, heat pump 34 is a thermoelectric device. At the same time that the fluid stream containing water vapor is introduced to second sorbent assembly 12B, a dry fluid stream is introduced to first sorbent assembly 12A. The dry fluid stream is introduced to bed 22A through inlet passage 18A, travels through bed 22A and exits first sorbent assembly 12A at outlet passage 20A. Sorbent material 32 in bed 22A desorbs water to the dry fluid stream. In order to easily switch beds 22A and 22B of water recovery system 10 between sorbing and desorbing modes, three-way valves 36A, 36B, 38A and 38B can be employed.

In water recovery system 10 illustrated in FIGS. 1 and 2, heat pumps 14 and 34 are not powered at the same time. Heat pump 14 is powered only when first sorbent assembly 12A is the sorbing bed as described with respect to FIG. 1. Heat pump 14 heats bed section 28B and cools bed section 28A. Heat pump 34 is powered only when second sorbent assembly 12B is the sorbing bed as described with respect to FIG. 2. Heat pump 34 heats bed section 24A and cools bed section 24B. When not powered, heat pumps 14 and 34 do not interfere with the thermal linkage between bed sections 24A and 24B and bed sections 28A and 28B and allow passive heat transfer between the beds. Since heat pumps 14 and 34 do not require large amounts of power to operate, the sorbing/desorbing cycles can be changed frequently (i.e. the sorbing and desorbing beds are switched). In a typical implementation, a high percentage (for example 90%) of the water vapor in the fluid stream entering through passage 18A when first sorbent assembly 12A is the sorbing bed can be transferred to the final fluid stream exiting through passage 20A when first sorbent assembly 12A is the desorbing bed.

Figure 3:
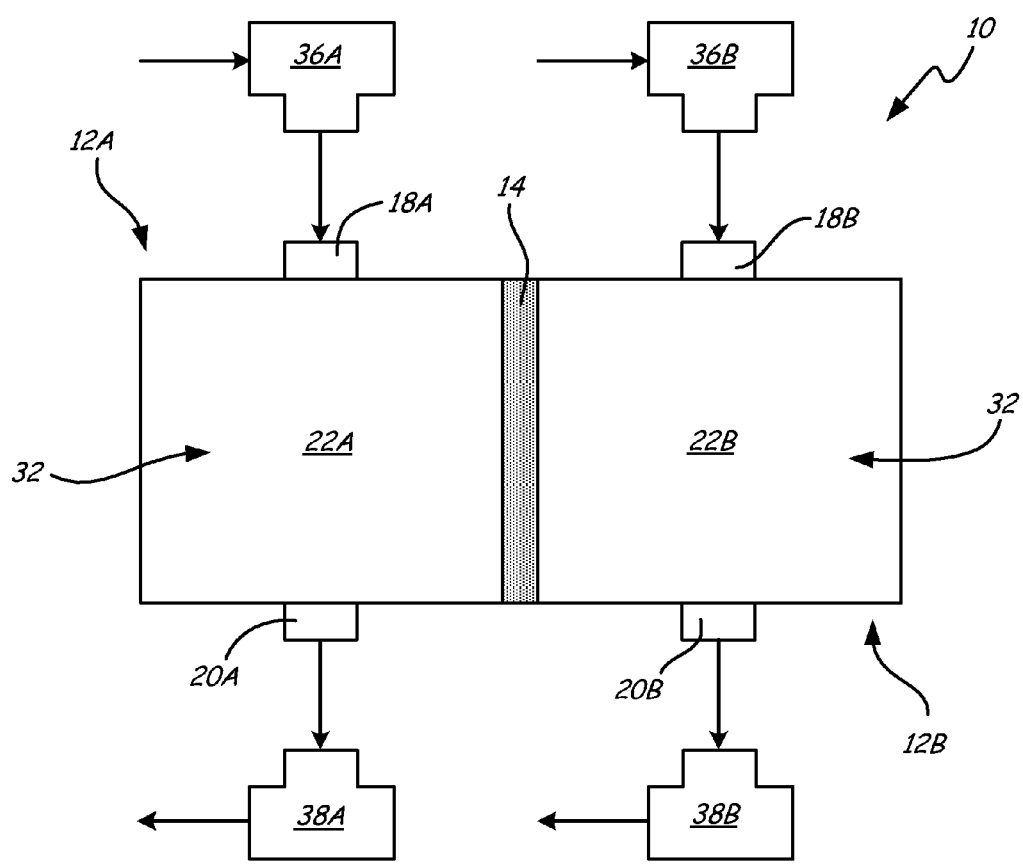
FIG. 3 illustrates a water recovery system having a heat pump that extends the length of the sorbing and desorbing beds.

FIGS. 1 and 2 illustrated beds 22A and 22B roughly divided into thirds (e.g., 24A, 26A and 28A each have equal areas). According to these illustrations, about two-thirds of the length of each bed engages in passive heat transfer through the thermal linkage and one-third of the length of each bed engages in active heat transfer via heat pumps 14 or 34. In exemplary embodiments, the length of each bed engaging in both passive and active heat transfer (i.e. the length of heat pumps 14 and 34) is between about 10% and 100% of the total bed length. That is, heat pump(s) 14 and/or 34 extend between about 10% of the length of the beds and the entire length of the beds. In particularly exemplary embodiments, heat pump(s) 14 and/or 34 extend between about 25% of the bed length about 50% of the bed length. FIG. 3 illustrates one embodiment of water system recovery 10 in which heat pump 14 extends the entire length of beds 22A and 22B. In this embodiment, only one heat pump 14 is integrated within water recovery system 10. In this case, the power drawn by heat pump 14 is greater than that of the previously described water recovery system 10. This arrangement requires additional power, but provides for simpler manufacturing and pressure drop advantages.

Figure 4:
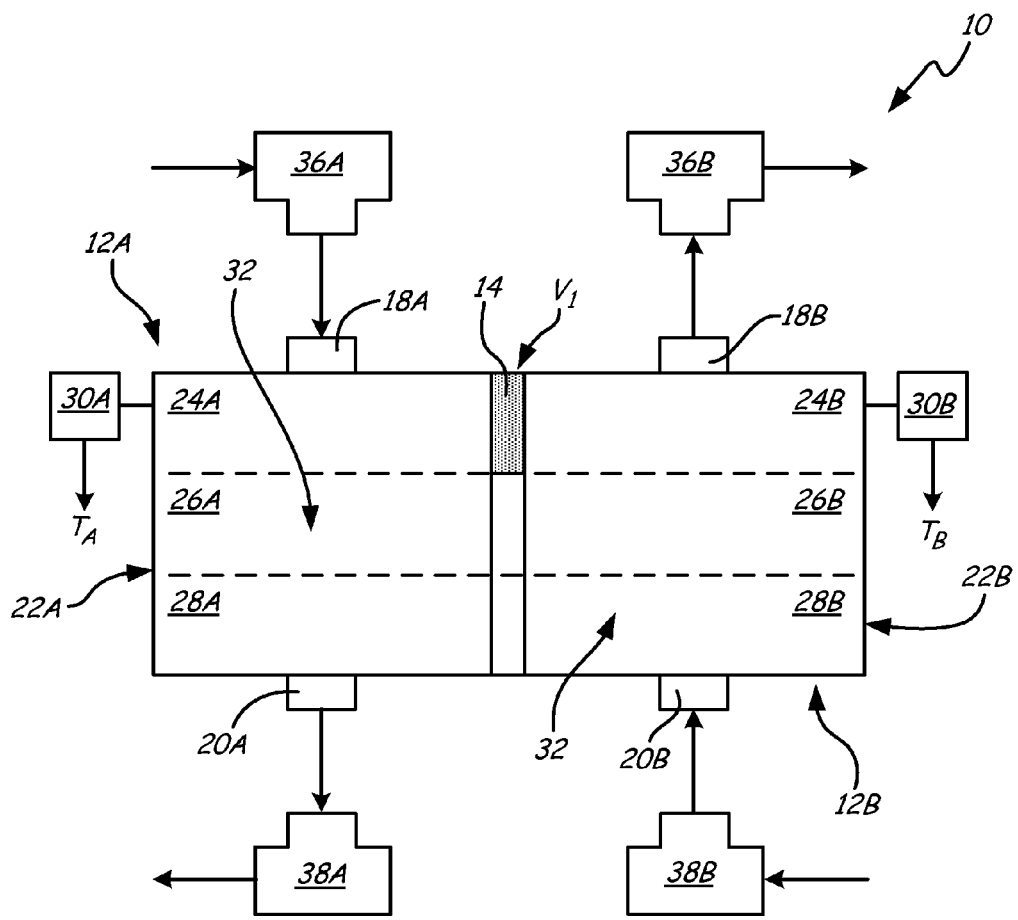
FIG. 4 illustrates a water recovery system in which the fluid streams of the sorbing and desorbing beds flow in opposite directions.
Figure 4:
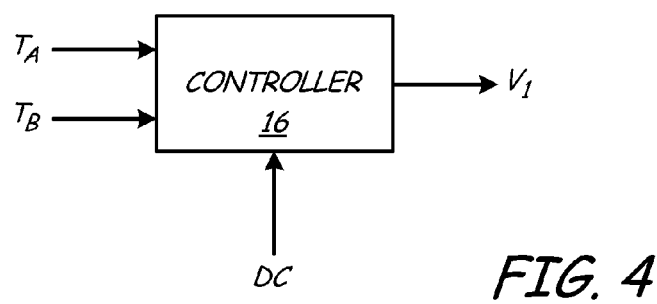

FIGS. 1 and 2 illustrate water recovery system 10 utilizing co-directional flow of the fluid streams. Some embodiments of water recovery system 10 utilize a counter-flow arrangement. FIG. 4 illustrates an embodiment of water recovery system 10 in which the fluid streams flow in opposite directions. In this embodiment, first sorbent assembly 12A is the sorbing bed and second sorbent assembly 12B is the desorbing bed. Sorption, desorption and passive heat transfer occur as described above. In an exemplary embodiment, heat pump 14 is located at the interface of the "wet" ends of beds 22A and 22B. As will be recognized by those skilled in the art based on the direction of flow illustrated in FIG. 4, bed sections 24A and 24B generally contain more water than the other sections of beds 22A and 22B, respectively. Locating heat pump 14 at the end of the beds with high water content provides for a maximum potential desorption. Only a single heat pump is needed in this arrangement. As in the embodiments described above, heat pump 14 can extend between about 10% and 100% of the length of the beds. Since only one heat pump 14 is present in this embodiment, both temperature sensors (30A and 30B) are located near the wet ends of beds 22A and 22B. Controller 16 distributes power to heat pump 14 to heat the desorbing bed and cool the sorbing bed.

Figure 5:
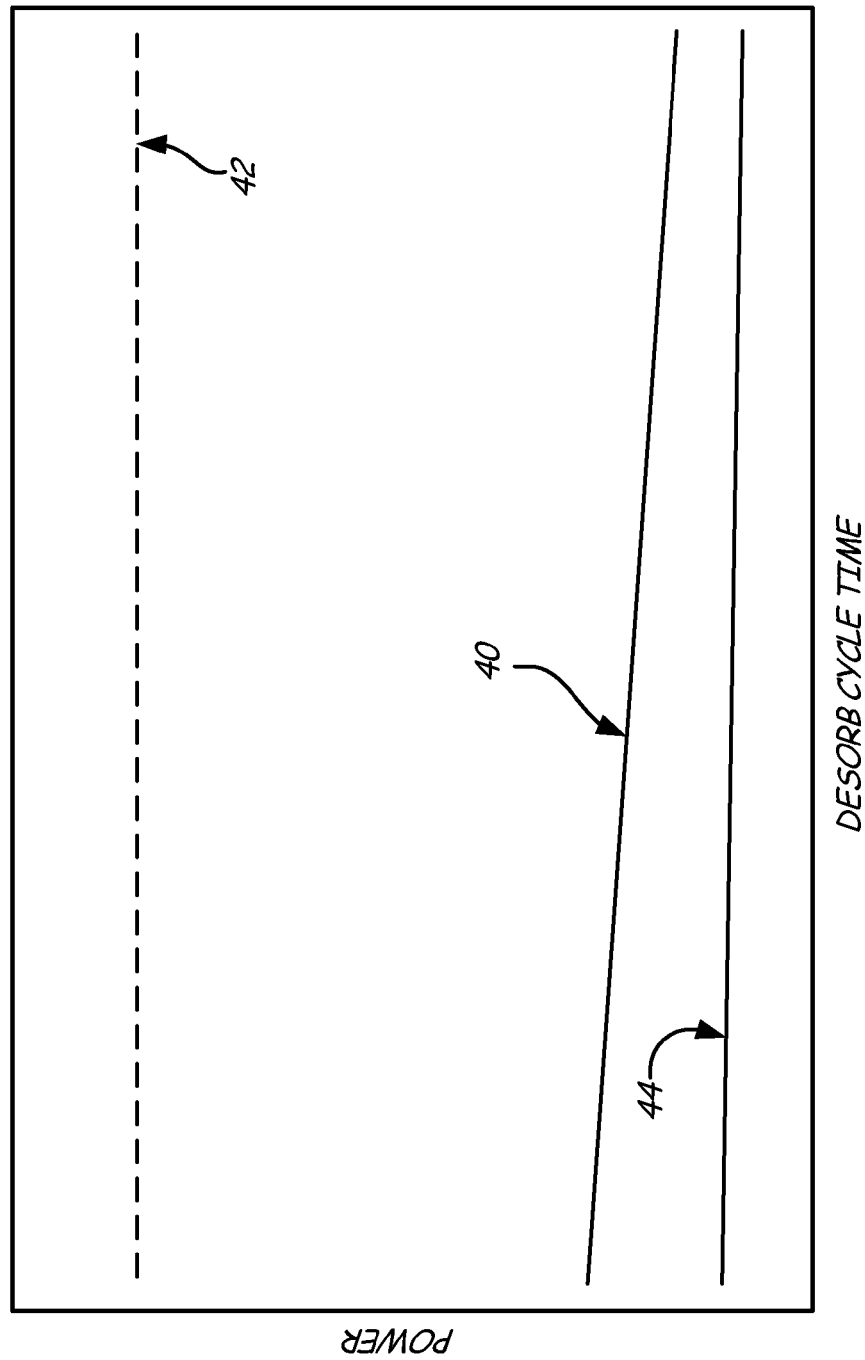
FIG. 5 is a graph showing energy requirements for different water recovery systems.

FIG. 5 illustrates representative power inputs for the "wet ends" of a simulated prior art water recovery system and a simulated water recovery system 10 of the type embodied according to FIG. 4. The simulation presupposes equal air flow (~25 CFM), humidity load (~55 F inlet dewpoint) and humidity recovery performance (~90%) for both water recovery systems. The power inputs required to operate each water recovery system (y-axis) are related to the cycle time between sorbing and desorbing modes (x-axis). As the cycle time is increased, the power requirements for some water recovery systems decrease, but the size and mass of the sorbent bed assembly increases in proportion to the cycle time. As a means of illustrating the relative power inputs for each system, line 40 shows the ideal power required to desorb the desorbing bed (i.e. the heat of adsorption of the water vapor removed during the desorb interval, assuming no losses and no change in the sorbent bed temperature). The power required to desorb the wet end of the desorbing bed (assuming no losses) varies between about 170 watts and about 95 watts as the rate of desorption declines during an exemplary 5 minute cycle time. Line 42 represents the current state of the art and shows the power required to desorb the desorbing bed using an external heat exchanger in which the heat transfer fluid is air. The power required to desorb the wet end of the desorbing bed using an external air heat exchanger is about 600 watts. Line 42 is well above line 40 (i.e. requires more power) due to parasitic losses resulting from air's low thermal capacity and the need to heat the sorbent mass at the dry end of the bed to a substantially higher temperature in order to achieve the required temperature at the desorbing bed's (wet) exit end. Conversely, line 44 represents the embodiment of water recovery system 10 illustrated in FIG. 4 and is below line 40. The power required to desorb the wet end of the desorbing bed using the thermally linked beds 12A and 12B and heat pump 14 of water recovery system 10 is between about 40 watts and about 50 watts. Thus, FIG. 5 illustrates the reduced power requirements of water recovery system 10 when compared to prior art systems.

The present invention provides a method for recovering water from a fluid stream. The method includes directing a first fluid stream through a first sorbent bed so that water in the first fluid stream is sorbed by a first sorbent within the first sorbent bed. The sorption of water from the first fluid stream by the first sorbent generates heat. The method also includes heating a second sorbent bed with the heat generated by the sorption of water in the first sorbent bed. The second sorbent bed is positioned adjacent to and thermally linked with the first sorbent bed. The second sorbent bed has a fluid stream inlet, a fluid stream outlet and a bed length equal to a distance between the fluid stream inlet and the fluid stream outlet. The method further includes powering a heat pump located between the first sorbent bed and a second sorbent bed to actively heat the second sorbent bed and cool the first sorbent bed. The heat pump is generally located near the outlet of the second sorbent bed. The method also includes directing a second fluid stream through the second sorbent bed so that when the second sorbent bed is heated, water is desorbed from a second sorbent located within the second sorbent bed. The desorbed water is removed from the second sorbent bed by the second fluid stream. The method further includes maintaining an area of the second sorbent bed at a temperature greater than a temperature of the first sorbent bed at an area adjacent to the area of the second sorbent bed. The area of the second sorbent bed that is maintained at a higher temperature than the adjacent area of the first sorbent bed extends from the fluid stream outlet of the second sorbent bed to a length between about 10% and about 100% of the bed length from the fluid stream outlet.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A water recovery system comprising:
 a sorbing bed for receiving a first fluid stream and sorbing water from the first fluid stream, the sorbing bed comprising:
  an inlet;
  a sorbent; and
  an outlet;
 a desorbing bed for receiving a second fluid stream and desorbing water to the second fluid stream, the desorbing bed comprising:
  an inlet;
  a sorbent; and
  an outlet, wherein the sorbing bed and the desorbing bed are aligned so that an area near the outlet of the sorbing bed is aligned with an area near the inlet or the outlet of the desorbing bed, and wherein the sorbing bed and the desorbing bed are thermally connected to provide passive heat transfer from the sorbing bed to the desorbing bed;
 a heat pump positioned between the sorbing bed and the desorbing bed for actively transferring heat from the sorbing bed to the desorbing bed; and
 a controller for distributing power to the heat pump to maintain an area near the outlet of the desorbing bed at a temperature greater than an area of the sorbing bed aligned with the area near the outlet of the desorbing bed.

2. The water recovery system of claim 1, wherein the sorbents of the sorbing and desorbing beds are selected from the group consisting of silica gels, zeolite molecular sieves, anion/cation ion exchange media, ceramic or polymeric substrates impregnated with one or more hygroscopic salts and combinations thereof.

3. The water recovery system of claim 2, wherein the one or more hygroscopic salts are selected from the group consisting of cesium carbonate, cesium fluoride, calcium chloride, lithium bromide and combinations thereof.

4. The water recovery system of claim 1, wherein the heat pump comprises a thermoelectric device.

5. The water recovery system of claim 4 further comprising:
 a power source for powering the thermoelectric device and the controller.

6. The water recovery system of claim 4, wherein the sorbing and desorbing beds each have a generally equal bed length measured from the inlets to the outlets, and wherein the thermoelectric device has length between about 10% of the bed length and 100% of the bed length.

7. The water recovery system of claim 6, wherein the thermoelectric device has length between about 25% of the bed length and about 50% of the bed length.

8. The water recovery system of claim 1 further comprising:
 a second heat pump positioned between the sorbing bed and the desorbing bed for transferring heat between the sorbing bed and the desorbing bed,
 wherein the controller controls the second heat pump.

9. The water recovery system of claim 8, wherein the second heat pump comprises a thermoelectric device.

10. The water recovery system of claim 1, wherein a difference between the temperature of the area near the outlet of the desorbing bed and the temperature of the area of the sorbing bed aligned with the area near the outlet of the desorbing bed is between about 2° C. and about 50° C.

11. The water recovery system of claim 1, wherein the difference between the temperature of the area near the outlet of the desorbing bed and the temperature of the area of the sorbing bed aligned with the area near the outlet of the desorbing bed is between about 5° C. and about 30° C.

12. A method for recovering water from a fluid stream, the method comprising:
 directing a first fluid stream through a first sorbent bed so that water in the first fluid stream is sorbed by a first sorbent within the first sorbent bed;
 passively heating a second sorbent bed positioned adjacent to and thermally linked with the first sorbent bed with heat generated by the sorption of water in the first sorbent bed, the second sorbent bed having a fluid stream inlet, a fluid stream outlet and a bed length equal to a distance between the inlet and the outlet;
 powering a heat pump located between the first sorbent bed and the second sorbent bed to actively heat the second sorbent bed and cool the first sorbent bed;
 directing a second fluid stream through the second sorbent bed so that when the second sorbent bed is heated water is desorbed from a second sorbent located within the second sorbent bed and removed from the second sorbent bed by the second fluid stream; and maintaining an area of the second sorbent bed extending from the fluid stream outlet to a length between about 10% and about 100% of the bed length at a temperature greater than a temperature of the first sorbent bed at an area adjacent to the area of the second sorbent bed.

13. The method of claim 12, wherein the first and second sorbents are selected from the group consisting of silica gels, zeolite molecular sieves, anion/cation ion exchange media, ceramic or polymeric substrates impregnated with one or more hygroscopic salts and combinations thereof.

14. The method of claim 13, wherein the one or more hygroscopic salts are selected from the group consisting of cesium carbonate, cesium fluoride, calcium chloride, lithium bromide and combinations thereof.

15. The method of claim 12, wherein the heat pump comprises a thermoelectric device.

16. The method of claim 15, wherein the thermoelectric device has length between about 10% of the bed length and 100% of the bed length.

17. The method of claim 16, wherein the thermoelectric device has length between about 25% of the bed length and about 50% of the bed length.

18. The method of claim 12, wherein a difference between the temperature of the area of the second sorbent bed and the temperature of the first sorbent bed at an area adjacent to the area of the second sorbent bed is between about 2° C. and about 50° C.

19. The method of claim 18, wherein the difference between the temperature of the area of the second sorbent bed and the temperature of the first sorbent bed at an area adjacent to the area of the second sorbent bed is between about 5° C. and about 30° C.

20. The water recovery system of claim 7, wherein the thermoelectric device is positioned near the outlet of the sorbing bed.

* * * * *